United States Patent [19]

Melamed

[11] Patent Number: 4,543,296

[45] Date of Patent: Sep. 24, 1985

[54] CONDUCTIVE POLYMERS

[75] Inventor: Nathan T. Melamed, Pittsburgh, Pa.

[73] Assignee: Westinghouse Electric Corp., Pittsburgh, Pa.

[21] Appl. No.: 569,874

[22] Filed: Jan. 11, 1984

[51] Int. Cl.⁴ .............................................. B32B 27/30
[52] U.S. Cl. ...................................... 428/522; 427/58;
 427/255.1; 427/255.2; 427/255.3; 427/255.6;
 427/294; 428/523; 526/286; 526/291; 526/319;
 526/341; 526/344; 526/348; 526/351; 526/352
[58] Field of Search ..................... 427/58, 294, 255.6,
 427/255.1, 255.2, 255.3; 428/522, 523; 526/286,
 291, 319, 341, 344, 348, 351, 352

[56] References Cited

U.S. PATENT DOCUMENTS 4,264,642 4/1981 Ferralli .................................. 427/38

*Primary Examiner*—Bernard D. Pianalto
*Attorney, Agent, or Firm*—Richard D. Fuerle

[57] ABSTRACT

Disclosed is a method of making a conductive polymer from a non-aromatic ethylenically unsaturated gaseous monomer comprising bombarding an inert substrate with the monomer at a velocity greater than Mach 1. This can be accomplished in a vacuum using a molecular beam. Ethylene or other suitable monomer can be mixed with an inert carrier gas such as nitrogen, helium, or argon for use in the process.

22 Claims, 1 Drawing Figure

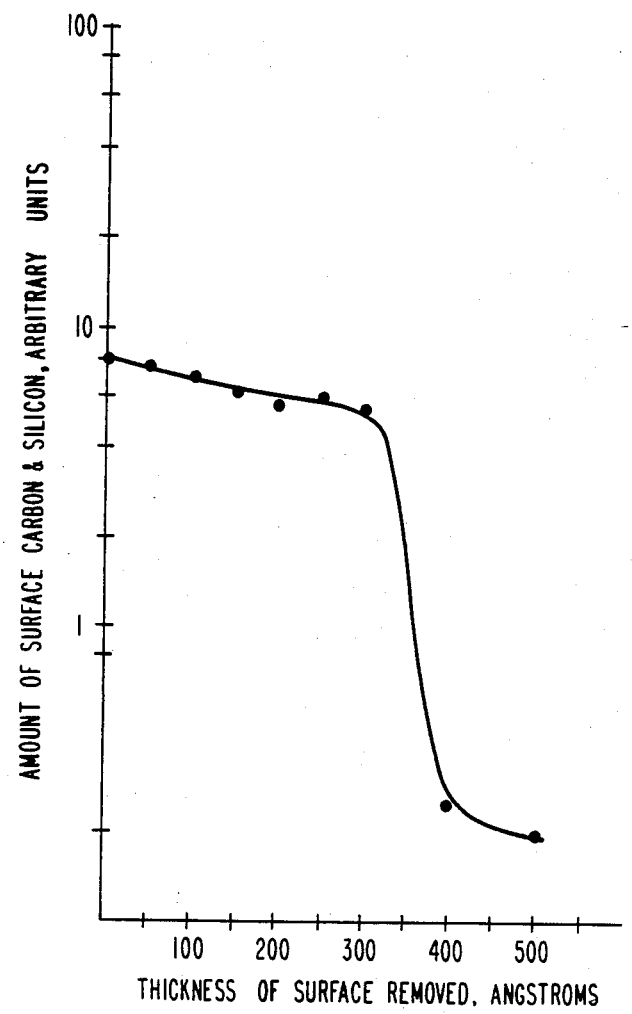

CONDUCTIVE POLYMERS

BACKGROUND OF THE INVENTION

Organic polymers are usually thought of as being materials of high electrical resistance. Indeed, most modern insulation is made out of organic polymeric materials. However, relatively recently it has been discovered that organic polymers can be made which are conductive. The best known and most conductive of these polymers is polyacetylene. Other conductive polymers include polypyrrole and polyphenylene sulfide. Many of the conductive polymers are made conductive by adding dopants, such as arsenic pentafluoride, iodine bromine, sulfuric acid, alkaline metals, and other chemicals, to the monomer prior to polymerization.

SUMMARY OF THE INVENTION

I have discovered that conductive polymers can be made from non-aromatic ethylenically unsaturated gaseous monomers, such as ethylene, by bombarding an inert substrate with the monomer at a velocity greater than Mach 1. That a polymer is produced by this method using ethylene is in itself quite surprising because no catalyst is present and ethylene is not known to polymerize in the absence of a catalyst. That the resulting polymer should turn out to be conductive is even more surprising since conventionally produced polyethylene is not conductive and no dopant is mixed into the ethylene monomer to make the polymer conductive.

The process of this invention can produce conductive coatings and films of predetermined thickness and conductivity which are useful in a wide variety of applications.

BRIEF DESCRIPTION OF THE DRAWING

The accompanying drawing is a graph which presents data discussed in the Example.

DESCRIPTION OF THE INVENTION

In the process of this invention, a suitable monomer is accelerated in a vacuum to a velocity significantly greater than Mach 1. The accelerated monomer strikes a suitable substrate, forming a conductive polymeric coating on the substrate. The acceleration of the monomer to a velocity of greater than Mach 1 can be accomplished in a molecular or "nozzle" beam, where a neutral gaseous monomer under high pressure is permitted to escape through a nozzle into a vacuum. Effusive or "oven" beams, where the molecules are heated and permitted to escape through an orifice, are not suitable as the molecules in an effusive beam are not accelerated to a sufficient velocity and there is danger of decomposing the compound if the oven is at too high a temperature. Velocities of greater than Mach 1, and preferably greater than Mach 2, are required in this invention because a sufficient kinetic energy must be imparted to the monomer to break its bonds on impact with the substrate. A vacuum sufficiently low to prevent significant molecular collision, typically $10^{-3}$ torr or less, is required in the region between the molecular beam and the substrate. The substrate is placed in the collision free region of the beam, which is an area far enough from the nozzle that collisions between the monomers are minimized.

The monomers which are useful in this invention are non-aromatic ethylenically unsaturated additionpolymerizable monomers which are gaseous at the temperature of the molecular beam nozzle. Hydrocarbons, halocarbons, and halohydrocarbons, with or without pendant oxygen and/or sulfur substituents thereon, may be used. Mixtures of such monomers may also be desirable if the properties of a copolymer are needed. Hydrocarbons are preferred as they work well in the process. Suitable monomers include ethylene, propylene, vinyl chloride, and acrylonitrile. Ethylene is preferred as it has been found to work very well in the process of this invention.

Preferably, a carrier gas is mixed with the monomer to impart additional kinetic energy to it. The carrier gas should be such that in the collision region, it accelerates the monomer by imparting to it additional kinetic energy. Suitable inert gases which may be used as carrier gases include helium, argon, nitrogen, krypton, and xenon. The preferred carrier gases are nitrogen, helium, and argon as they are commonly used and have high values of $\gamma$, where $\gamma$ is the specific heat ratio $C_p/C_v$. The carrier gas may be mixed with the monomer in any proportion. The greater the proportion of carrier gas, the higher the monomer kinetic energy will be, but the less will be the monomer throughput and the rate of buildup of polymer on the substrate.

The substrate is an inert material capable of withstanding the impact of the monomer and carrier gases. Suitable substrates include silicon, glass, silica, and germanium. Semiconductive substrates, such as silicon and germanium, may be used to produce electronic devices by masking the conductive polymer coating, then etching the unmasked portions away to produce a conductive circuit pattern on the substrate. A destructible substrate can be used if it is desired to produce a free-standing film instead of a coating on a substrate. A substrate of sodium chloride, for example, can be dissolved in water after the polymer is formed to produce a film.

The thickness of the coating or film depends upon the length of time that the substrate is bombarded with the molecular beam and the flux or pressure on the monomer in the nozzle. The conductivity of the film can be controlled by altering the mixture of monomers, or by adding up to about 10% (by weight) of other polymerizable monomers, such as acetylene, which are not the monomers of this invention. Polymers (and other substances) are considered by those skilled in the art to be "conductors" (or "semiconductors") if they have resistivities less than $10^8$ ohm-cm.

In addition to being used to make electronic devices such as organic transistors, the conductive polymers can also be used as anti-corona coatings which conduct the charge away from an area where a corona discharge might otherwise occur.

The following example further illustrates this invention.

EXAMPLE

This experiment establishes that a conductive polyethylene coating can be formed on a silicon substrate by the process of this invention.

A substrate consisted of a 2×2 mm. square of heavily doped non-degenerate silicon. The silicon square served as a bolometer, and therefore had two electrical leads attached near opposite edges. The silicon was cooled to a temperature of 4.5° K. by attaching it to the base of a liquid helium cooled dewar. A mixture of equal volumes of $N_2$ and ethylene was passed through a 0.003" diameter nozzle at a stagnation pressure of 5000 torr (6.7 atm.). The gas mixture issuing from the nozzle passed into a vacuum chamber whose average pressure was about $4 \times 10^{-7}$ torr, obtained by differential pumping. The gas struck the substrate at a distance of 60 cm. downstream of the nozzle. After operating the beam for several minutes, a very large loss in sensitivity of the bolometer was observed, by about a factor of 50, compared with earlier measurements of bolometer sensitivity.

The surface of the substrate was analyzed using Auger analysis, which showed that the surface was covered with a layer of a carbon containing material whose spectrum was characteristic of polyethylene bonds. To determine the thickness of the polymer layers, successive 50 angstrom thick portions of the surface were removed in stages by means of argon ion-planing. The removal of each layer was followed by Auger analysis of the surface composition. The results are shown in the drawing. The drawing shows that the magnitude of the carbon signal decreased slowly with each successive ion-planing until approximately 300 angstroms were removed. Removal of the next 50 angstroms resulted in an abrupt 20-fold drop in signal indicating that the thickness of the deposited carbon layer was approximately 325 angstroms. The drawing also shows that as the carbon signal diminished, the signal due to silicon increased towards an asymptotic value. Also, the removal of 500 angstroms of the surface was not sufficient for the carbon signal to go to zero, nor for the silicon signal to reach its asymptotic value, which indicates some possible diffusion of the polyethylene into the silicon.

The sensitivity of the undamaged bolometer at a bias current of 2 microamps and at 4° K. was $8.8 \times 10^{-4}$ watt. Its resistance at this current was 180K ohms. Following exposure to the ethylene molecular beam, the bolometer resistance fell to 24K ohms and the sensitivity to such a low value that the device was useless as a bolometer. After the removal of 500 angstroms of surface layer, the resistance rose to 163K ohms and the sensitivity rose to $0.92 \times 10^4$ V/W. At these values, the bolometer was much better, but still a factor of nearly 10 below the original sensitivity. Since the removal of the initial 500 angstrom surface had not completely eliminated all of the surface carbon (about 2.5% of initial carbon signal remained), an additional 500 angstroms was ion-planed off the surface. The effect of this final ion-plane was to raise the resistance to 584K ohms and the sensitivity to $3.38 \times 10^5$ V/W. At 2 microamps bias current, this was a four-fold improvement over the original bolometer sensitivity. At a bias current of 1 microamp, the relative improvement and sensitivity was greater yet, going from $1.22 \times 10^5$ V/W to $8.22 \times 10^5$ V/W, a seven-fold improvement. The original carbon film had the properties of an ohmic resistor whose value was about 28K ohms.

I claim:

1. A method of making a conductive polymer from a non-aromatic ethylenically unsaturated gaseous neutral addition-polymerizable monomer, comprising bombarding an inert substrate with said monomer at a velocity greater than Mach 1 in a vacuum.

2. A method according to claim 1 wherein said monomer has a velocity greater than Mach 2.

3. A method according to claim 1 wherein said monomer is selected from the group consisting of hydrocarbons, halocarbons, halohydrocarbons, pendant oxygen containing derivatives thereof, pendant sulfur containing derivatives thereof, and mixtures thereof.

4. A method according to claim 1 wherein said monomer is a hydrocarbon.

5. A method according to claim 4 wherein said monomer is ethylene.

6. A method according to claim 1 wherein said substrate is silicon.

7. A method according to claim 1 wherein said substrate is germanium.

8. A method according to claim 1 wherein said velocity is obtained using a molecular beam, where an inert carrier gas is mixed with said monomer.

9. A method according to claim 8 wherein said inert carrier gas is selected from the group consisting of nitrogen, helium, argon, and mixtures thereof.

10. A method according to claim 1 wherein said substrate is at a cryogenic temperature.

11. A method according to claim 1 wherein said vacuum is at least $10^{-3}$ torr.

12. A method of forming a conductive polymeric coating on an inert substrate comprising:
    (a) mixing a non-aromatic ethylenically unsaturated gaseous hydrocarbon neutral addition-polymerizable monomer with an inert carrier gas selected from the group consisting of nitrogen, helium, argon, and mixtures thereof;
    (b) accelerating said mixture in a molecular beam to a velocity of greater than Mach 2, in a pressure less than about $10^{-3}$ torr; and
    (c) permitting said accelerated mixture to strike said inert substrate in the free expansion region of said molecular beam.

13. A method according to claim 12 wherein said monomer is ethylene.

14. A conductive polymer made according to the method of claim 1.

15. An electronic device comprising a conductive polymer on a substrate made according to the method of claim 1.

16. A method according to claim 1 wherein said monomer is selected from the group consisting of ethylene, propylene, vinyl chloride, and acrylonitrile.

17. A method according to claim 1 wherein said substrate is selected from the group consisting of silicon, glass, silica, and germanium.

18. A method according to claim 1 wherein said substrate is a material that can be destroyed without destroying said conductive polymer, and said method includes the additional last step of destroying said substrate without destroying said conductive polymer, whereby a film is produced.

19. A method according to claim 1 wherein the conductivity of said conductive polymer is altered by mixing with said monomer up to about $10^{-7}$ by weight of a polymerizable monomer other than a non-aromatic ethylenically unsaturated gaseous monomer.

20. A method according to claim 19 wherein said polymerizable monomer is acetylene.

21. A method of making a polymer having a resistivity less than $10^8$ ohm-cm from a non-aromatic ethylenically unsaturated gaseous neutral addition-polymerizable monomer, comprising bombarding an inert substrate with said monomer at a velocity greater than Mach 1 in a vacuum.

22. A polymer made according to the method of claim 21.

* * * * *